April 15, 1969     F. V. GRABNER     3,438,098
SLACK TAKEUP DEVICE
Filed March 27, 1967
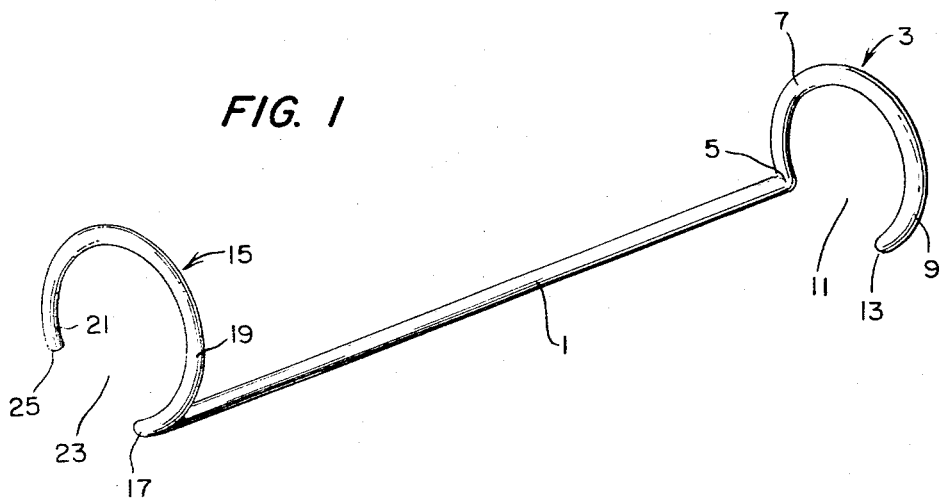
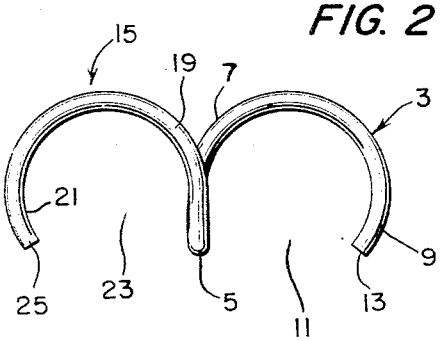
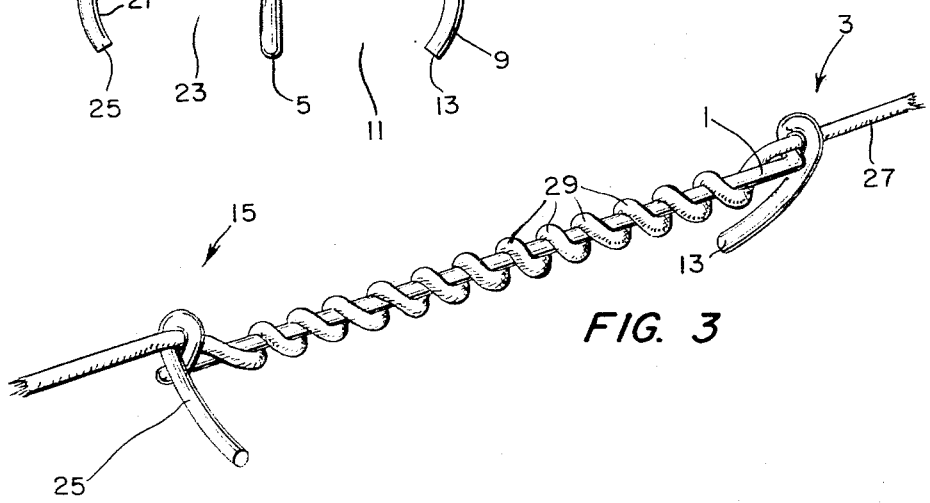
INVENTOR.
Lloyd V. Grabner
BY
Peck & Peck
ATTORNEYS

United States Patent Office 3,438,098
Patented Apr. 15, 1969

3,438,098
SLACK TAKEUP DEVICE
Floyd V. Grabner, 517 W. 24th St.,
Pueblo, Colo. 81003
Filed Mar. 27, 1967, Ser. No. 626,119
Int. Cl. F16g *11/12*; A44b *21/00*
U.S. Cl. 24—131                                    1 Claim

ABSTRACT OF THE DISCLOSURE

This invention relates to a slack takeup device which is adapted to be applied to a rope, cable, or the like, flexible element, and comprises generally an elongated spine having oppositely directed hooks at each end thereof, the spine and hooks being formed of bendable or pliant material, and the hooks adapted to receive the flexible element therethrough and when applied to the flexible element one of said hooks is clamped about the flexible element, so that the takeup device may be swung around to cause the flexible element to coil about the spine to take up the desired amount of slack therein.

---

This invention relates broadly to an article of manufacture, in the nature of a slack takeup device, which is adapted to take up or remove slack in ropes, cables, or the like, flexible elements, and in its more specific aspects it relates to such an article of manufacture which when applied to the flexible element will, by easy manipulation thereof, with respect to the flexible element cause the flexible element to coil about the article of manufacture to thereby remove slack in the flexible element; and the nature and objects of the invention will be readily recognized and understood by those skilled in the arts to which it relates in the light of the following explanation and detailed description of the accompanying drawings illustrating what I at present believe to be preferred embodiments or mechanical expressions of my invention from among various other forms, arrangements, combinations and constructions, of which the invention is capable within the spirit and scope thereof.

In a great many uses of rope, cable, or the like, flexible elements which may be a connecting medium between elements or mechanisms, it is desirable that the flexible element be shortened by taking up slack therein without the necessity of disconnecting either one or both of the ends of the flexible elements in order to accomplish this purpose. While many slack takeup devices have been devised for accomplishing the aforementioned purposes, as far as I am aware, most of them are difficult to adapt and apply to the flexible element, or require disconnection of one or both ends of the flexible element before the slack takeup device may be applied thereto and are somewhat difficult not only to attach but to operate in order to remove the slack in the flexible element.

It has been one of my prime purposes in evolving this invention to provide a slack takeup device for flexible elements which overcomes the aforementioned and other defects in slack takeup devices which are presently in use in commerce.

In achieving this major purpose I have provided a slack takeup device which is easily applied to a flexible element and then by simple manipulations will cause the flexible element to become coiled to the degree necessary to take up the required slack in order to shorten the length of the flexible element. This application of my slack remover to the flexible element is done without the necessity of disconnecting either end of the flexible element, is easy to apply and use, requiring no special skills in either its application thereto or its operation to take up the slack.

One of the significant characteristics of the slack takeup device is its easy initial application to and fixing one end of the device to the flexible element so that it may be easily manipulated to take up the necessary slack in the flexible element. This is provided by means which are provided on each end of the takeup device, either one of which may be easily deformed to clamp the flexible element to the device so that the latter may be manipulated relatively to the flexible element for taking up slack, whereupon the other end may then be easily deformed to securely clamp the device to the flexible element.

The slack takeup device, which I have devised, is of simple construction, may be manufactured at minimal cost and is of sufficient strength and durability to maintain its slack removing position on a flexible element for substantial lengths of time. As a matter of fact, it has been designed to provide sound slack removing characteristics, while having an operating life which is at least as long as the life of the flexible element to which it is applied for taking up slack.

With the foregoing general objects, features and results in view, as well as certain others which will be apparent from the following explanation, the invention consists in certain novel features in design, construction, mounting and combination of elements, as will be more fully and particularly referred to and specified hereinafter.

In the accompanying drawings:

FIG. 1 is a view in perspective of my slack takeup device.

FIG. 2 is an end view of the slack takeup device.

FIG. 3 is a view in perspective of the slack takeup device in operative position on a flexible element taking up slack therein.

Referring to the accompanying drawings, wherein I have illustrated the takeup device of this invention which is formed of a pliant metal, or the like, of a guage which is suitable for the size and relative flexibility of the flexible element with which it is to be used in order to take up the required degree of slack therein. It is to be understood that this slack takeup device is operable upon a variety of types or sizes of flexible elements which may be rope, cable, or other types of metallic, or non-metallic, flexible connecting elements. As one example, from among many, of the type of flexible element upon which my slack takeup device may be used with facility is on vehicle brake cables which, in many instances, are of a greater length than is necessary, so that it is desirable to shorten such cables in a simple and expedient manner. This purpose is accomplished by my invention.

My slack takeup device comprises what I shall term an elongated metallic, or the like, spine which I have designed by the numeral 1. The length of the spine 1 is dependent upon the type of flexible element with which it is used and the amount of slack which it is desired to take up on the flexible element. At one end of the spine 1, I provide a hook member designated in its entirety by numeral 3. This hook element 3 extends from the spine 1 at approximately right angles thereto as illustrated at 5 in the drawings, and the hook member 3 is of arcuate configuration and extends upwardly as at 7 from its angled connection with the spine 1, and then curves outwardly and downwardly and is turned slightly toward the spine 1 as at 9, leaving opening 11 between the spine 1 and the end 13 of the hook through which the flexible element may extend as will be explained hereinafter.

At the opposite end of the spine 1 I provide a further hook member designated in its entirety by the numeral 15, and this hook member 15 is of substantially similar configuration to the hook member 3, however, while it extends from the spine in substantially right angles thereto as at 17 the same direction with respect to the spine as does that portion of the hook 3, the remaining arcuate portion of the hook 15 is curved and extends from the spine in a radially opposite direction from that portion of the spine 3. The hook 15 extends upwardly from the spine 1 as at 19 and then curves outwardly and downwardly and is turned slightly toward, but spaced from the spine 1 as at 21, leaving opening 23 between the spine 1 and the end 25 of the hook through which the flexible element may extend. It is to be understood, and it is significant that the hook 15 is curved away from the spine 1 in a direction which is radially the opposite of the direction of curvature of the hook 3.

In FIG. 3 of the drawings I have illustrated my slack takeup device in operative slack removing position applied to a flexible element 27 which may be a metallic or non-metallic rope, cable, or the like. In the application of my device to a flexible element it is merely necessary to place one of the hooks, either 3 or 15, over the cable and in this instance, merely by way of example, I shall describe the hook 3 being first placed over the flexible element 27. When this has been done the rook 3, which as I have stated is formed of a pliant or bendable material, is clinched together clamping the flexible element 27 therein, as clearly illustrated in FIG. 3 of the drawings. With one end of the slack takeup device so secured to the flexible element the remainder of the takeup device is swung around over and under the flexible element so as to wrap the flexible element around the spine 1 to provide a plurality of coils 29 around the spline. It will be appreciated that these coils 29 of the flexible element take up the required slack therein and it will be further appreciated that the greater the amount of slack to be removed will result in a greater number of coils 29 of the flexible element, thereby shortening the length of the flexible element. After the required number of coils have been formed on the spine 1 to take up the necessary slack the hook 15, which is also pliable, is then clamped on the flexible element to maintain the slack takeup device in operative position with respect to the flexible element 27.

It will now be apparent that I have evolved a slack takeup device which is of simple construction, is easy to initially apply to a flexible element and then is manipulated with great facility to take up the necessary slack and is then operated upon to maintain the takeup device in operative slack removing position on the flexible device.

I claim:

1. A slack takeup device, including an elongated spine, the length of said spine being all in the same axial plane, a hook extending from each end of said spine, and each hook being of arcuate configuration and the end of each of said hooks being spaced from and in a radial plane with its respective end of the spine, said hooks being formed of a pliable material and adapted to receive therethrough and to clamp therein the flexible element having slack removed therefrom, and one of said hooks extending radially from said spine and the other of said hooks extending radially from said spine in a direction opposite to the direction from which said one of said hooks extends.

References Cited

UNITED STATES PATENTS

| 119,429 | 9/1871 | Haworth | 24—71.3 |
| 1,356,316 | 10/1920 | Shepherd | 24—131 |
| 3,296,670 | 1/1967 | Burnett | 24—131 |

FOREIGN PATENTS

| 699,964 | 2/1931 | France. |
| 575,498 | 2/1946 | Great Britain. |

BERNARD A. GELAK, Primary Examiner.

U.S. Cl. X.R.

24—71.3